Jan. 13, 1953 R. H. HALVORSEN 2,625,601

AUTOMATIC TELEGRAPH SWITCHING SYSTEM

Filed Feb. 3, 1950 4 Sheets-Sheet 1

INVENTOR
RALPH H. HALVORSEN
BY Emery Robinson
ATTORNEY

Jan. 13, 1953

R. H. HALVORSEN 2,625,601

AUTOMATIC TELEGRAPH SWITCHING SYSTEM

Filed Feb. 3, 1950

4 Sheets-Sheet 2

INVENTOR
RALPH H. HALVORSEN

BY Emery Robinson
ATTORNEY

AUTOMATIC TELEGRAPH SWITCHING SYSTEM

Filed Feb. 3, 1950 4 Sheets-Sheet 3

INVENTOR
RALPH H. HALVORSEN
BY Emery Robinson
ATTORNEY

Jan. 13, 1953 R. H. HALVORSEN 2,625,601

AUTOMATIC TELEGRAPH SWITCHING SYSTEM

Filed Feb. 3, 1950 4 Sheets-Sheet 4

INVENTOR
RALPH H. HALVORSEN
BY Emery Robinson
ATTORNEY

Patented Jan. 13, 1953 2,625,601

UNITED STATES PATENT OFFICE 2,625,601

AUTOMATIC TELEGRAPH SWITCHING SYSTEM

Ralph H. Halvorsen, Chicago, Ill., assignor to Teletype Corporation, Chicago, Ill., a corporation of Delaware Application February 3, 1950, Serial No. 142,263

15 Claims. (Cl. 178—2)

This invention relates to printing telegraphy and more particularly to printing telegraph switching systems.

The present switching system finds itself particularly useful and efficient in relatively small telegraph systems consisting of the order of ten stations. This does not mean and is not to be construed as a limitation upon the present system for it is contemplated that the present system may and will be used in linking together a larger number of stations.

The principal object of the present invention is to provide a relatively inexpensive, efficient switching system having automatic or semi-automatic operation incorporated therein.

The present system does not contemplate that there be any fixed type of equipment at the outlying stations, but rather, the invention is applicable so long as each transmitting station is provided with any one of the well known types of transmitters, either manually operated or tape controlled. Further it is only necessary that each receiving station be provided with any one of the standard well known printing telegraph receivers.

The principal apparatus at the central office comprises a cross bar switch and a selective control unit of the type disclosed in the copending application of W. J. Zenner, Serial No. 739,747, filed April 7, 1947. For a more complete understanding of this selective control unit reference should be had to this application of W. J. Zenner, which is hereby incorporated by reference into the present disclosure. Other apparatus at the central office includes a plurality of relays and operating circuits therefor.

By the present invention there can be but a single address selection in progress at any one time however, once a receiving station has been selected and the circuit thereto established then the address selection apparatus is released and available for the purpose of establishing connection between two other stations.

The central office is provided with a sequence circuit which insures that only one station can transmit an address sequence at one time. This circuit is controlled by a set of relays with one relay being provided for each outlying station. Each of these relays controls a similar group of contacts. The corresponding contacts in each group are connected in series and by means of this arrangement a station can transmit an address sequence only when no other station higher or lower in the sequence thereof is attempting to do so. When a station is free to transmit it commences by transmitting the address signals corresponding to the station to which the message is to be directed. These address signals are received by the selective control unit which responds by closing a contact corresponding to such signals. Proper circuits are thereby established to actuate the cross bar switch so as to connect the transmitting station with the receiving station. The sequence circuit previously referred to is restored to normal condition and other transmitters can be connected to the receivers at other stations.

A more specific object of the invention is therefore to provide a telegraph switching system employing a selective control unit and a crossbar switch as the principal apparatus units thereof.

Another object of the invention is to provide a simple circuit arrangement for enabling one transmitter to commence transmitting a message and to prevent other transmitters from operating until connections have been established with an addressee station.

A further object of the invention is to provide a switching system wherein the switching gear is utilized only during the actual operation of selecting and establishing connection with an addressee station.

Another object of the invention is to provide a switching system wherein multiple address messages may be handled by merely placing the addresses of all stations to which the message is to be directed in the address portion of the message.

These and other objects and advantages will be apparent to those skilled in the art from the following detailed description of the invention when read in conjunction with the accompanying drawings wherein.

Figures 1, 5:
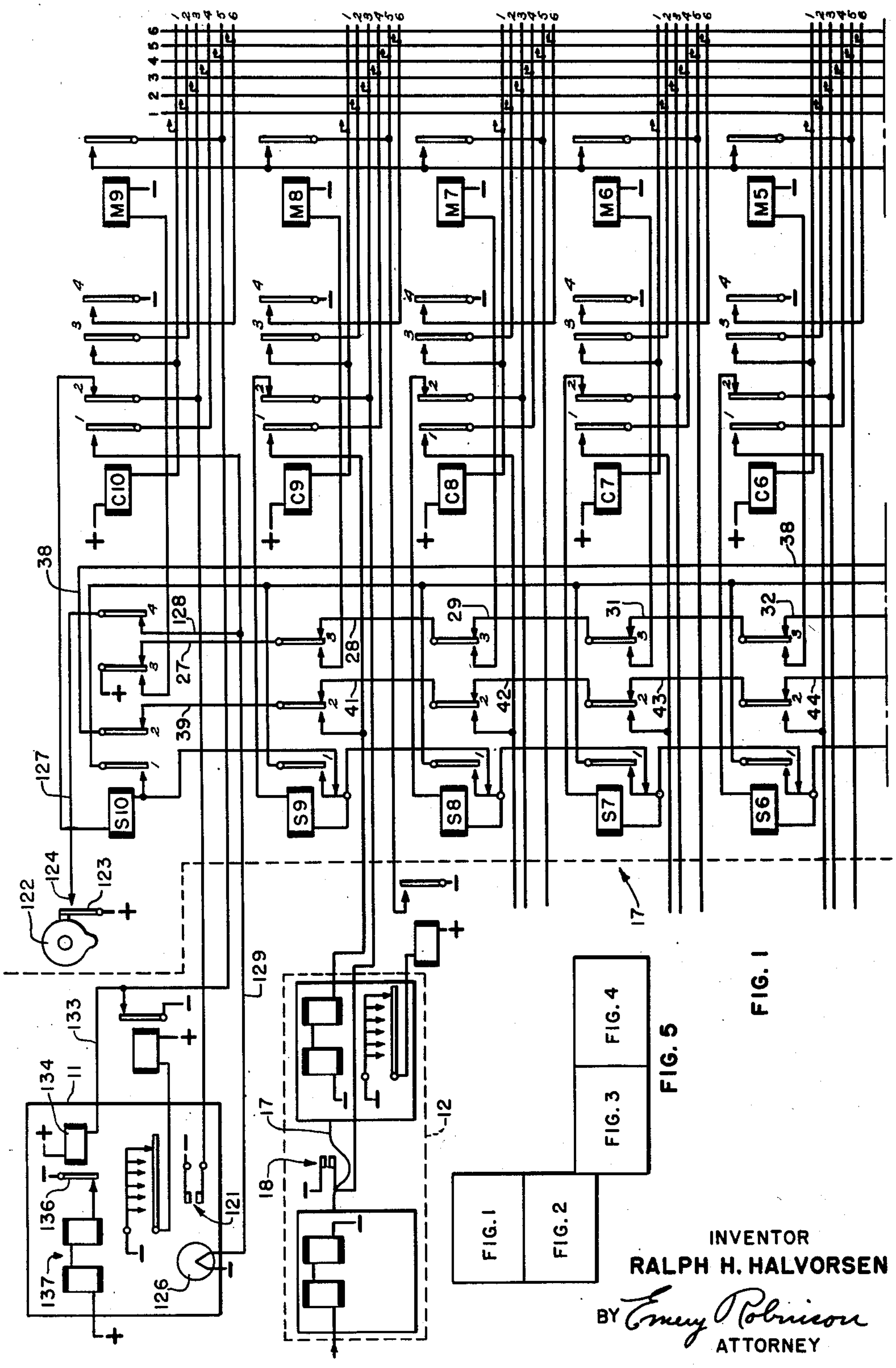
Figs. 1–4 represent a schematic circuit diagram of the present invention.
Fig. 5 shows the proper arrangement for assembling Figs. 1–4.
Figure 2:
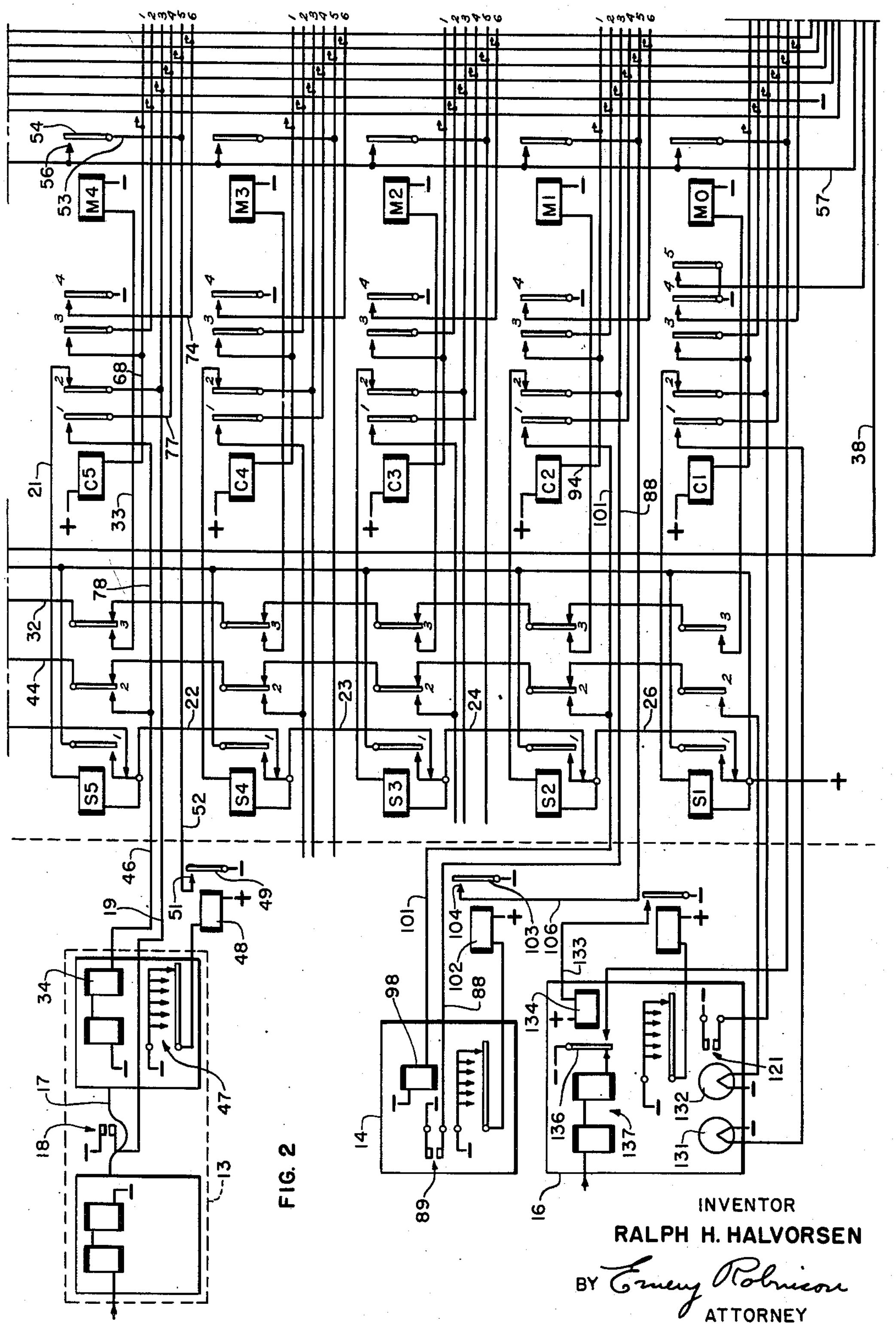

Referring now to the drawings, a plurality of outlying stations are provided, of which only a few are represented by a send-receive telegraph printer 11, reperforator transmitters 12 and 13, a tape transmitter 14, and a send-receive printer 16. All of these units are units well known in the telegraph art. A central office, represented generally by reference numeral 15, has a set of sequence relays S1–S10, connecting relays C1–C10, and a set of selector magnets M0–M9.

When an outlying station, as station 13 for example, has a message to transmit, such message is in the form of a tape 17 which, when inserted in the transmitter closes a contact pair 18. When the contact pair 18 is closed a circuit is established from negative battery, through the contact pair 18, over a line 19, through an armature No. 2 of the connecting relay C5, through the back contact associated with this armature No. 2, over a lead 21, through the sequence relay S5, over a lead 22, through the make before break contacts associated with armature No. 1 of the relay S4, over a lead 23, through the make before break contacts associated with armature No. 1 of relay S3, over lead 24, through the make before break contacts associated with armature No. 1 of the relay S2, over a lead 26, through the make before break contacts associated with armature No. 1 of the relay S1, to positive battery. When the sequence relay S5 is thus energized, it pulls up all of its armature into engagement with their make contacts and thereby opens the make before break contacts associated with its No. 1 armature. Therefore none of the stations associated with sequence relays S6–S10 can establish a circuit to energize such relay as the chain circuit is broken at the make before break contacts associated with the No. 1 armature of the relay S5.

When the relay S5 pulls up its No. 3 armature a circuit is established from positive battery, through the armature No. 3 of the relay S10 and its back contact, over a lead 27 through the armature No. 3 of the relay S9 and its back contact, over a lead 28, through the armature No. 3 of the relay S8 and its back contact, over a lead 29, through the armature No. 3 of the relay S7 and its back contact, over a lead 31 through the armature No. 3 of the relay S6 and its back contact, over a lead 32, through the front contact associated with armature No. 3 of the relay S5, over a lead 33, through the selector magnet M4, to negative battery.

Figure 4:
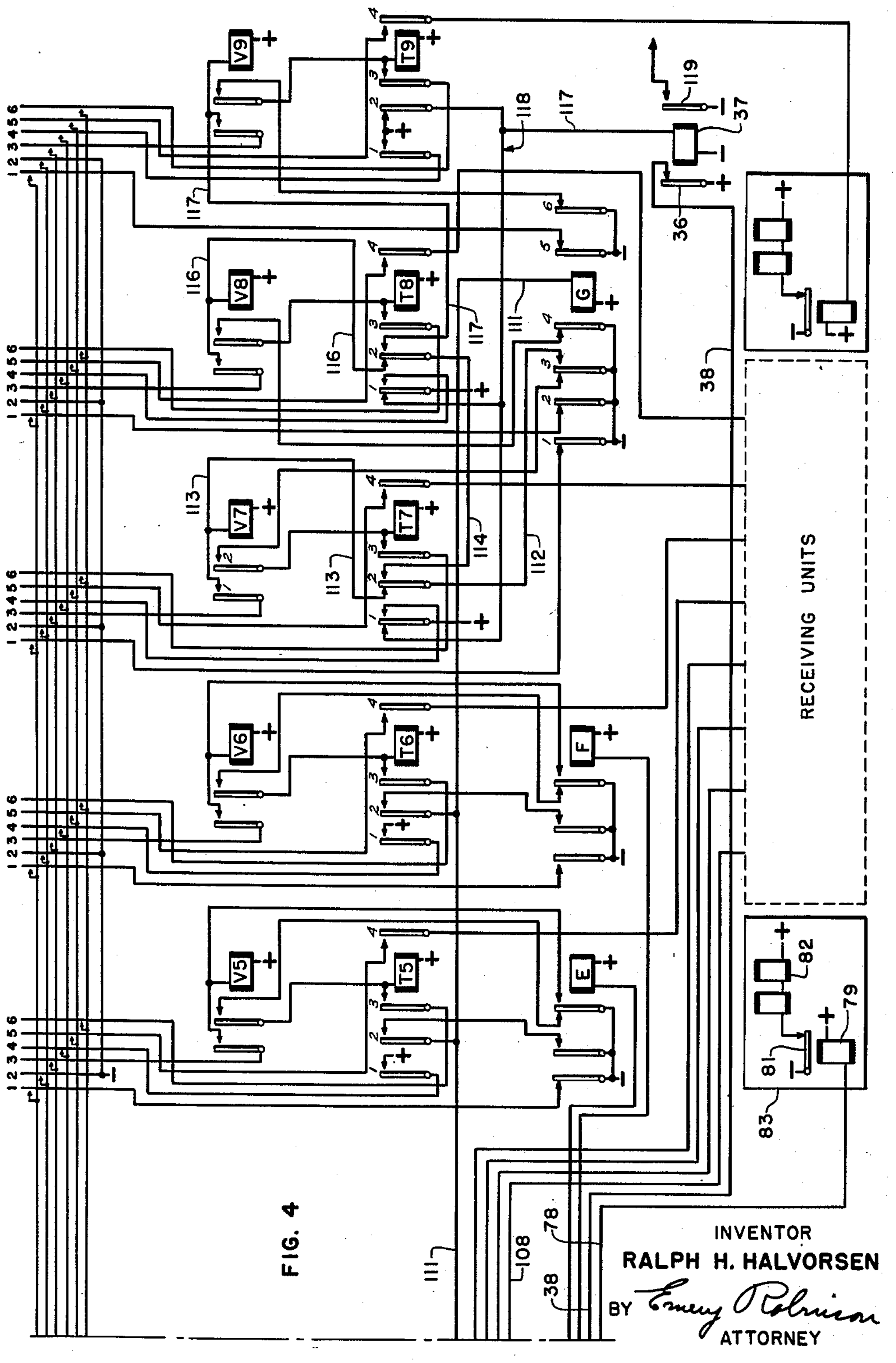

When the relay S5 pulls up its No. 2 armature a circuit is established to energize a starter clutch magnet 34 in the reperforator transmitter 13, which extends from positive battery, through a normally pulled up armature 36 and its front contact of a normally energized overflow relay 37 (Fig. 4), over a lead 38, through the armature No. 2 of the relay S10 and its back contact, over a lead 39, through the armature No. 2 of the relay S9 and its back contact, over a lead 41, through the armature No. 2 of the relay S8 and its back contact, over a lead 42, through the armature No. 2 of the relay S7 and its back contact, over a lead 43, through the armature No. 2 of the relay S6 and its back contact, over a lead 44, through the armature No. 2 of the relay S5 and its front contact, over a lead 46, through the clutch magnet 34 in the reperforator transmitter 13.

Energization of the clutch magnet 34, causes transmission from the reperforator transmitter 13 to commence. As was pointed out heretofore the address of the station to which the message is directed is first transmitted. Actually the address portion of the message will consist of a group of signals but for ease of understanding this address signal will be assumed to be an "A" and further that such "A" signal corresponds to the first station receiver 83. The "A" signal impulses are generated by transmitting contacts 47 and impressed, over an obvious circuit, to a line relay 48. The line relay 48 operates its armature 49 in response to such impulses, which causes such impulses to be impressed upon a circuit extending from negative battery, through the armature 49, through a contact 51, over a lead 52, over a lead 53, through an armature 54 and its associated contact 56 of the selector magnet M4, which is now energized, over a lead 57, through a line relay 58 in a selective control unit 59, to positive battery. The line relay 58 operates its armature 61 which is in circuit with a selector magnet 62 in the selective control unit 59. Because the transmitted signal was an "A," an A contact closes in the selective control unit 59. Momentarily after the closure of the A contact the address sequence is completed by carriage return and line feed signals. The carriage return signal causes closure of a contact CR and a circuit is thereby established from negative battery, through closed contact CR, over a lead 63, through the closed contact A, over a lead 64, through an address A relay, to positive battery. The closure of the A contact is but momentary however inasmuch as the line feed signal following the carriage return signal opens all the contacts A–F, and CR, and therefore the A relay is closed only momentarily, but the A relay nevertheless pulls up its armatures Nos. 1, 2 and 3.

When the A relay is energized a circuit is established from negative battery, through the No. 1 armature of the A relay and its make contact, over a lead 84 through the No. 4 armature and its back contact of a connecting relay T0 over a lead 86, through a vertical holding magnet V0 to positive battery. It will be recalled that the horizontal selector magnet M4 was energized previously and now that the vertical holding magnet V0 is also energized the cross points of the leads in the cross bar switch corresponding to both of these magnets are closed. When the vertical holding magnet V0 pulls up its armatures Nos. 1 and 2 upon its energization it establishes its own locking circuit from positive battery, through the magnet V0, through the No. 2 armature of the magnet V0 which is closed against its associated make contact over a lead 67, over the No. 3 lead in the cross bar switch of the vertical corresponding to holding magnet V0, over the No. 3 lead of the horizontal corresponding to selector magnet M4, over the lead 19, through the contact pair 18, to negative battery. Obviously this locking circuit for the vertical holding magnet V0 remains completed so long as the contact pair 18 remains closed which occurs so long as a message tape 17 remains in the reperforator transmitter 13.

Immediately after the relay A becomes de-energized a circuit is established to the connecting relay C5, from positive battery, through the relay C5, over a lead 68, over the No. 1 lead of the horizontal corresponding to the selector magnet M4, over the No. 1 lead of the vertical corresponding to the holding magnet V0, over a lead 69, through the No. 2 armature and its back contact of the relay A, to negative battery. The connecting relay C5 then pulls up its armatures Nos. 1, 2, 3, and 4.

Energization of the magnet V0 causes its No. 1 armature to close against the corresponding make contact, and a circuit is thereby completed for the connecting relay T0 which extends from positive battery, through the connecting relay T0, over a lead 71, through the No. 1 armature and its make contact of the holding magnet V0, over a lead 72', through the No. 1 armature and its back contact of the relay A, to negative battery. The connecting relay T0 locks up over a circuit extending from positive battery, through the magnet T0, through No. 3 armature and its back contact of the magnet T0, over a lead 73, over the No. 6 lead of the vertical corresponding to the holding magnet V0, over the No. 6 lead of the horizontal corresponding to the selector magnet M4, over a lead 74, through the No. 4 armature and its corresponding front contact of the connecting relay C5, to negative battery.

Closure of the No. 2 armature of the connecting relay T0 against its corresponding front contact energizes the clutch magnet 34 in the reperforator transmitter 13 to cause it to continue transmitting. This energizing circuit for the clutch magnet 34 extends from positive battery, through the No. 2 armature and its front contact of the connecting relay T0, over a lead 76, over the No. 4 lead of the vertical corresponding to the holding magnet V0, over the No. 4 lead of the horizontal corresponding to the selector magnet M4, over a lead 77, through the No. 1 armature of the relay C5 and its corresponding front contact, over a lead 78, over the lead 46 through the clutch magnets 34, to negative battery. Therefore the transmitter 47 is caused to resume its transmission over a circuit to be hereafter traced.

When the connecting relay C5 became energized it pulled up its No. 2 armature thereby breaking the circuit to the relay S5. When the relay S5 became de-energized its No. 3 armature fell away from its make contact thereby breaking the circuit to the selector magnet M4. De-energization of the selector magnet M4 at this time is of no effect as the holding magnet V0 remains energized to retain the cross points closed of the horizontal corresponding to magnet M4 and of the vertical corresponding to magnet V0.

The transmission circuit for the transmitter 47 therefore extends, after going through the line relay 48, from negative battery, through the armature 49 and contact 51, over the lead 52, over the No. 5 lead of the horizontal corresponding to magnet M4, over the No. 5 lead of the vertical corresponding to magnet V0, through the No. 1 armature and its make contact of the connecting relay T0 over a lead 78, through a line relay 79 in a receiver at station "A," to positive battery. An armature 81 responds to the impulses received by the relay 79 and in so doing makes and breaks a circuit to a selector magnet 82 in a receiving unit 83 at station "A." Transmission of the message continues until the contact 18 opens when the tape 17 in the transmitter 47 runs out. When contact 18 opens the locking circuit for the holding magnet V0 breaks and this results in breaking the circuits through the cross points connecting the horizontal associated with the selector magnet M4 and the vertical associated with the holding magnet V0. Therefore the connecting relay C5 and the connecting relay T0 release.

When any other than the station 13 has a message B, C, D, E, or F, such message is handled in a manner similar to that already described for a message to be transmitted to station "A."

Figure 3:
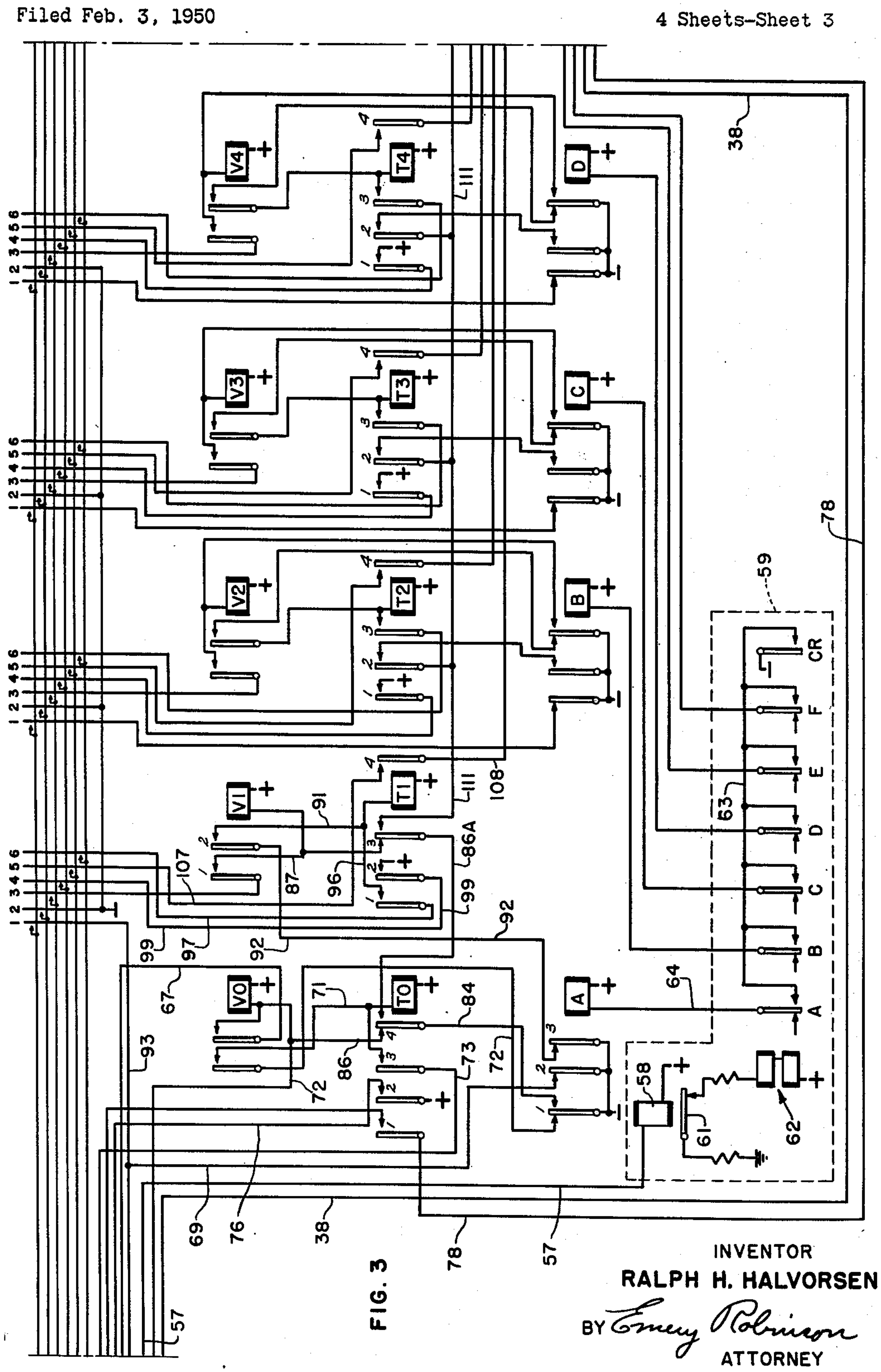

It will be noted from an inspection of Fig. 3 that the relay A also is adapted to energize the holding magnet V1 whenever the holding magnet V0 and connecting relay T0 are energized. Providing the magnet V1, under control of the relay A, makes it possible to send two messages to station "A" simultaneously. Of course it is necessary that station "A" be provided with two receivers in order to accomplish this.

A description of the operation of the magnets V1 and T1 will now be given. It will be assumed that the transmitter 47 is in the process of transmitting a message to station "A," that the selector magnet M4 is de-energized, that the magnet V0 and relay T0 are energized, and that the transmitter 14 has seized control of the switching gear and transmitted the address signal "A." Under these conditions the selector magnet M1 and the sequence relay S2 are energized.

The "A" signal is received by the selector magnet 62 in the selective control unit 59 and causes the contact A to close, thereby completing the previously traced circuit to the relay A. When the relay A is energized it pulls up its three armatures. The No. 1 armature of relay A, in closing with its front contact completes a circuit to the holding magnet V1 which extends from negative battery through the armature No. 1 of the relay A and its front contact, over a lead 84, through the presently closed No. 4 armature of relay T0 and its front contact, over a lead 86A, through the No. 3 armature and its back contact of the connecting relay T1, through the holding magnet V1, to positive battery.

The holding magnet V1, upon being energized, is effective to close the cross point contacts between its vertical and the horizontal corresponding to the selector magnet M1 which is associated with the sending station transmitter 14. The holding magnet V1 then completes its own locking circuit which extends from positive battery, through the holding magnet V1, over a lead 87, through the presently closed No. 1 armature and its front contact of the holding magnet V1, over the No. 3 lead of the vertical corresponding to the magnet V1, over the No. 3 lead of the horizontal corresponding to the selector magnet M1, over a lead 88, through a contact pair 89 which is closed when the transmitter 14 is transmitting, to negative battery.

Recalling that the A relay is energized only momentarily due to closure of the A contact in the selective control unit 59, when the No. 2 armature of the holding magnet V1 closes against its front contact a circuit is established to energize the holding magnet T1. This circuit extends from positive battery, through the magnet T1, over a lead 91, through the No. 2 armature and its front contact of the holding magnet V1, over a lead 92, through the No. 3 armature and its back contact of the relay A, to negative battery.

Upon closure of the cross point contacts connecting the horizontal associated with the selector magnet M1 and the vertical associated with the holding magnet V1, the connecting relay C2 becomes energized over a circuit extending from positive battery, through the relay C2 over a lead 94, over the No. 1 lead of the horizontal associated with the selector magnet M1, over the No. 1 lead of the vertical associated with the holding magnet V1 over a lead 93, over the lead 69, through the armature No. 2 and its back contact of the relay A, to negative battery. Upon energization of the connecting relay C2 the circuit to the sequence relay S2 is broken due to the No. 2 armature of the relay C2 being pulled up. A locking circuit is established for the connecting relay C2 over a circuit extending from positive battery, through the relay C2, over the lead 94, through the now closed No. 3 armature and its front contact of the relay C2, over the lead No. 2 of the horizontal corresponding to the selector magnet M1, over the lead No. 2 of the vertical corresponding to the holding magnet V1, to negative battery.

Upon closure of the No. 4 armature of the connecting relay C2, a locking circuit is established for the connecting relay T1 over a circuit extending from positive battery through the connecting relay T1, over a lead 96, through the No. 1 armature and its front contact of the connecting relay T1 over a lead 97, over the No. 6 lead of the vertical corresponding to the holding magnet V1, over the No. 6 lead of the horizontal corresponding to the selector magnet M1, through the No. 4 armature and its back contact of the connecting relay C2, to negative battery.

Closure of the No. 2 armature and its front contact of the connecting relay T1, completes a circuit for energizing a clutch magnet 98 in the transmitter 14. This circuit extends from positive battery through the closed No. 2 armature and its front contact of the connecting relay T1, over a lead 99, over the No. 4 lead of the vertical controlled by the holding magnet V1, over the No. 4 lead of the horizontal corresponding to the selector magnet M1 through the No. 1 armature and its front contact of the connecting relay C2, over a lead 101, through the clutch magnet 98, to negative battery. The energization of the clutch magnet 98 continues so long as the connecting relay T1 is energized, and this continues until the message is entirely transmitted whereupon the contact pair 89 opens.

The message being transmitted by the transmitter 14 is first impressed to a line relay 102 which operates its armature 103 in response to such impressed signal impulses. The armature 103 makes and breaks with a front contact 104 which thereby impresses signals upon a circuit extending from negative battery, through the armature 103 and contact 104, over a lead 106, over the No. 5 lead of the horizontal corresponding to the selector magnet M1, over the No. 5 lead of the vertical controlled by the holding magnet V1, over a lead 107, through the No. 4 armature and its front contact of the connecting relay T1, over a lead 108, to a second receiving unit (not shown except by the block representing station receiving units) at the receiving station "A."

When the connecting relay T1 is energized its No. 3 armature is pulled up to engage its front contact and a circuit is thereby conditioned for energizing an overflow relay G upon receipt of another message address signal "A." If such "A" address signal is received by the selective control unit 59, while the magnets V0 and relay T0 are also energized, the No. 1 armature of the A relay, upon closing against its front contact completes a circuit from negative battery, through the No. 1 armature and front contact of relay A, over a lead 84, through the No. 4 armature and front contact of the connecting relay T0 over a lead 86A through the No. 3 armature and front contact of the connecting relay T1, over a lead 111, through the relay G, to positive battery. The relay G is energized also whenever an address signal "B"–"F" is received when the connecting relay T2–T6 is already energized, over a similar obvious circuit. Obviously the function of the relay G and the holding magnets V7–V9 and holding magnets T7–T9 associated therewith is to establish the necessary circuits for handling messages directed to stations when all the receivers at such stations are busy.

It will be noted that the energizing circuit for the relay G, which extends through the No. 1 armature of the relay A, is completed only when both connecting relays T0 and T1 are energized. This means of course, that a message directed to station "A" will go to one of the overflow receivers only if both receivers at station "A" are in operation.

Upon the energization of the relay G its six armatures are pulled up momentarily. The No. 3 armature is effective, upon closing against its front contact, to complete a circuit to the holding magnet V7. This circuit extends from negative battery, through the No. 3 armature of the relay G and its front contact, over a lead 112, through the No. 2 armature of the connecting relay T7 and its back contact, over a lead 113, through the holding magnet V7, to positive battery. The holding magnet V7, upon being energized establishes its own locking circuit through its No. 1 armature and associated front contact. This locking circuit is of the same type as the locking circuit for either the magnet V0 or V1, and therefore will not be described in detail. Closure of the No. 2 armature of the holding magnet V7 and its associated front contact completes an obvious energizing circuit for the connecting relay T7 which extends through the back contact associated with the No. 3 armature of the relay G.

Energization of the connecting relay T7 causes all of its armatures to be pulled up, the armature No. 1 making with its front contact to complete the energizing circuit to the clutch magnet of the transmitter transmitting the message, the armature No. 2 making with its front contact to condition an energizing circuit to the holding magnet V8 for operation upon the next energization of the relay G, the armature No. 3 making with its front contact to establish a locking circuit for the connecting relay T7, and the No. 4 armature making with its front contact to complete the transmission circuit from the transmitting station to one of the overflow receiving units.

If while the holding magnet V7 and connecting relay T7 are energized, the relay G is energized because another message is directed to a station having all of its receivers occupied, then an energizing circuit for the holding magnet V8 is established. This circuit extends from negative battery through the No. 3 armature of the relay G and its associated front contact, over the lead 112, through the No. 2 armature of the connecting relay T7 and its front contact, over a lead 114, through the No. 2 armature of the connecting relay T8 and its back contact, over a lead 116, through the holding magnet V8 to positive battery. The energized magnet V8 establishes circuits similar to those established by the holding magnet V7, among which is the energizing circuit for the connecting relay T8.

The connecting relay T8 upon becoming energized, pulls up all of its armatures. The armature No. 2 of the connecting relay T8, upon being drawn to its associated front contact, conditions a circuit to the holding magnet V9 which is completed when the relay G is again energized, provided the connecting relay T7 also is energized. The energizing circuit for the holding magnet V9 extends from negative battery, through the No. 3 armature of the relay G and its associated front contact, over the lead 112, through the No. 2 armature of the connecting relay T7 and its front contact, over the lead 114, through the No. 2 armature of the connecting relay T8 and its front contact, over a lead 117, through the holding magnet V9, to positive battery. When the holding magnet V9 is energized circuits similar to those established when holding magnet V7 is energized, are established, including the energizing circuit for the connecting relay T9.

It is to be noted that the energizing circuit for the overflow relay 37 extends from negative battery, through the overflow relay 37, over a lead 117, over a lead 118, and then through either the No. 1 armature of the connecting relay T7 and its back contact, the No. 1 armature of the connecting relay T8 and its back contact, or the No. 2 armature of the connecting relay T9 and its back contact, to positive battery. It is therefore apparent that if any one of the connecting relays T7, T8, or T9 are de-energized the overflow relay 37 is energized. However when all of the overflow receivers are occupied, which occurs when the connecting relays T7, T8, and T9 are energized, the overflow relay becomes de-energized. Under this condition an armature 119 falls away and engages its associated back contact to thereby complete a circuit to an alarm (not shown). The armature 36 also falls away, thereby breaking its connection with its front contact, and thus the chain circuit is broken through the No. 2 armatures of the S relays. Therefore when all of the overflow receivers are occupied no transmitter can start transmitting a message. In a system where all transmitters are manually operated the overflow receiver would not be needed.

The send-receive printer 11 is provided with a keyboard transmitter only and therefore when a message is ready for transmission, a contact pair 121 is closed. Closure of this contact pair 121 sets up the circuits necessary to energize the relays S10 and C10, and the selector magnet M9. When the relay S10 pulls up its No. 4 armature, which occurs only when no other transmitter is attempting to transmit, a rotating cam 122 causes a contactor 123 to intermittently engage a contact 124 to thereby complete an intermittent circuit to a green lamp 126. This circuit extends from positive battery, through the contactor 123 and contact 124, over a lead 127, through the No. 4 armature of the relay S10 and its front contact, over a lead 128, over a lead 129, through the green lamp 126, to negative battery. The green lamp 126 then flashes indicating to the operator that transmission may be commenced. When the connection to the receiver has been established the relay C10 is energized, at which time the armature No. 1 of the relay C10 is closed against its front contact to complete a continuous circuit to the green lamp 126. This circuit to the green lamp 126 through the No. 1 armature of the relay C10 is the same type of a circuit as that which energizes the transmitter clutch magnet 34 in the reperforator transmitter 13. The continuous illumination of the green lamp 126 then indicates that the circuit to the receiver has been established and the operator may proceed with the transmission of the message.

The send-receive printer 16 has been provided with a green lamp 131 and an amber lamp 132 instead of the single green lamp. Upon the manual closure of the contact pair 121 in the printer 16, and the subsequent energization of the relay S1, and further with at least one of the overflow receivers not operating, then an obvious energizing circuit is established for the amber light 132 by way of the No. 2 armature of the relay S1. This indicates to the operator that transmission may be commenced. Upon the establishment of the transmitting circuit to the receiving unit, the connecting relay C1 is energized and an obvious circuit is completed through the No. 1 armature of the relay C1, to illuminate the green lamp 131. When the green lamp 131 illuminates, the operator knows that the body of the message may be transmitted.

The send-receive printers 11 and 16 have leads 133 which extend to line relays 134 and upon which, all signals generated by the send receive printer are impressed. These signals control armatures 136 which are in circuit with receiving selector magnets 137. These selector magnets 137 represent the selector magnets of a home record printer. In order to send a message to either of the send-receive printers 11 or 16 it would only be necessary to extend the proper lead, presently leading to the receiving units (Fig. 4), to connect with one of the leads 133.

In an "on premise" system wherein all the transmitters and receivers are located within a small area the system would function as has been described. Where there are distant stations to be taken care of however, in order to decrease line costs, then the outlying station would be connected to a reperforator transmitter 12 or 13 which would relay all messages to or from such station.

The contact CR may be used in a system where it is desired to transmit multiple address messages. In such case the contacts A–F remain closed after once being closed, until the receipt of a carriage return signal. Thus an address of a message will contain the addresses of all stations to which it is desired to transmit the message, and will be followed by a carriage return signal which operates the contact CR. Only after the contact CR operates, all contacts A–F open.

It is intended that the present disclosure be illustrative of the invention only, and it is contemplated that numerous change and modifications will be made by those skilled in the telegraph art without departing from the spirit or scope of the invention.

What is claimed is:

1. In a telegraph message switching system, a plurality of outlying subscriber telegraph message transmitters, a plurality of outlying subscriber telegraph message receivers, a central office, switching means at said central office including a cross bar switch and a selective control unit, a normally open circuit connected between said selective control unit and all of said transmitters, horizontal selector magnets at said central office for closing the circuit to said selective control unit from any of said transmitters and for simultaneously selecting a horizontal group of leads of said cross bar switch corresponding to a transmitter initiating transmission, and vertical holding magnets at said central office operated by said selective control unit for selecting a vertical group of leads of said cross bar switch corresponding to a receiver to which the message is directed to thereby establish a direct circuit between said transmitter initiating transmission and said receiver to which the message is directed.

2. In a telegraph message switching system, a plurality of outlying subscriber telegraph message transmitters, a plurality of outlying subscriber telegraph message receivers, a central office, switching means at said central office including a cross bar switch and a selective control unit, horizontal selector magnets at said central office for establishing a circuit to said selective control unit from any of said transmitters and for selecting a horizontal group of leads of said cross bar switch corresponding to a transmitter initiating transmission, means associated with said horizontal selector magnets for precluding all other of said transmitters from initiating transmission when one of said transmitters is initiating transmission, relay means at said central office operated by said selective control unit for selecting a vertical group of leads of said cross bar switch corresponding to a receiver to which the message is directed to thereby establish a direct circuit between said transmitter initiating transmission and said receiver to which the message is directed, and means operated by the operation of the relay means for rendering ineffective said precluding means.

3. In a telegraph message switching system, a plurality of outlying subscriber telegraph message transmitters, a plurality of outlying subscriber telegraph message station receivers, a plurality of said station receivers being adapted to receive messages having a common address, a central office including a crossbar switch and a selective control unit, horizontal selector magnets at said central office for establishing a circuit to said selective control unit from any of said transmitters and for simultaneously selecting a horizontal group of leads of said crossbar switch corresponding to a transmitter initiating transmission, a plurality of relay means at said central office individually cooperating with said selective control unit for selecting a vertical group of leads of said crossbar switch corresponding to a station receiver to which the message is directed to thereby establish a direct circuit between said transmitter initiating transmission and said receiver to which the message is directed, and means operated by one of said relay means associated with the common address receivers for conditioning for operation another of said relay means associated with said common address receivers whereby subsequent transmission of another message addressed to the common address receivers causes the selector control unit to operate the conditioned relay means to establish a direct circuit between said second transmitter initiating transmission and a second one of said common address receivers.

4. In a telegraph message switching system, a plurality of outlying subscriber telegraph message transmitters, a plurality of telegraph message overflow receivers, a central office including a crossbar switch and a selective control unit, horizontal selector magnets at said central office for establishing a circuit to said selective control unit from any of said transmitters and for selecting a horizontal group of leads of said crossbar switch corresponding to a transmitter initiating transmission, a first group of relay means at said central office cooperating with said selective control unit each of said individual relay means in the first group being adapted to select a vertical group of leads of said crossbar switch corresponding to a station receiver to which the message is directed to thereby establish a direct circuit between said transmitter initiating transmission and said receiver to which the message is directed, a second group of relay means at said central office cooperating with said selective control unit for selecting vertical groups of leads of said cross bar switch corresponding to said overflow receivers, and means operated by the energization of any of the first group of relay means for conditioning an unoperated one of said relay means of the second group for operation whereby messages directed toward a busy receiving station operate the selective control unit to operate said conditioned relay means of the second group to establish a direct circuit to one of said overflow receivers corresponding to said conditioned relay means of the second group.

5. In a telegraph message switching system, a plurality of outlying subscriber telegraph message transmitters, a plurality of outlying subscriber telegraph message station receivers, a plurality of telegraph message overflow receivers, a central office including a crossbar switch and a selective control unit, horizontal selector magnets at said central office for establishing a circuit to said selective control unit from any of said transmitters and for selecting a horizontal group of leads of said crossbar switch corresponding to a transmitter initiating transmission, a plurality of relay means at said central office individually cooperating with said selective control unit for selecting a vertical group of leads of said crossbar switch corresponding to a station receiver to which the message is directed to thereby establish a direct circuit between said transmitter initiating transmission and said receiver to which the message is directed, other relay means operative when a second message is directed to a station receiver already receiving a message for directing said second message to one of said overflow receivers by establishing a direct circuit between the transmitting station and such overflow receiver, and means operative when all of said plurality of overflow receivers are receiving a message from said transmitters for preventing transmission of messages by any other of said plurality of transmitters.

6. In a telegraph switching system, a plurality of outlying subscriber telegraph transmitters, a plurality of outlying subscriber telegraph receivers, a central office including a selective control unit and a crossbar switch, horizontal selector magnets for establishing a circuit to said selective control unit from any one of said transmitters, a plurality of relay means, said selective control unit being effective in response to address signals transmitted by one of said transmitters and corresponding to one of said receivers to actuate one of said relay means, any of said relay means being effective upon actuation by said selective control unit to cooperate with said horizontal selector magnets and said crossbar switch and thereby establish a direct circuit between an address signal originating transmitter and the receiver corresponding to the address signal, and a plurality of chain circuits cooperable with said horizontal selector magnets for preventing simultaneous establishment of more than a single one of said circuits to said selective control unit from any one of said transmitters.

7. In a telegraph switching system, a plurality of outlying subscriber telegraph transmitters, a plurality of outlying subscriber telegraph receivers, a central office including a selective control unit and a crossbar switch, horizontal selector magnets for establishing a circuit to said selective control unit from any one of said transmitters, and a plurality of relay means, said selective control unit being effective in response to address signals transmitted by one of said transmitters and corresponding to one of said receivers to actuate one of said relay means, any of said relay means being effective upon actuation by said selective control unit to cooperate with said horizontal selector magnets and said crossbar switch and thereby establish a direct circuit between an address signal originating transmitter and the receiver corresponding to the address signal, and means operated by the actuation of one of said relay means for releasing the horizontal selector magnet to break the circuit to the selective control unit.

8. In a telegraph switching system, a plurality of outlying subscriber telegraph transmitters, a plurality of outlying subscriber telegraph receivers, a central office including a selective control unit and a crossbar switch, horizontal selector magnets for establishing a circuit to said selective control unit from any one of said transmitters, a plurality of relay means, said selective control unit being effective in response to address signals transmitted by one of said transmitters and corresponding to one of said receivers to actuate one of said relay means, any of said relay means being effective upon actuation by said selective control unit to cooperate with said horizontal selector magnets and said crossbar switch and thereby establish a direct circuit between an address signal originating transmitter and the receiver corresponding to the address signal, and means actuated by any of said relay means for breaking said circuit to said selective control unit.

9. In an automatic telegraph message switching system, a plurality of outlying subscriber transmitters, a plurality of outlying subscriber receivers, a central switching office, a plurality of signalling channels interconnecting the transmitters and receivers with the central office, said central office including a plurality of first relays, a selective control unit, a single lead connected to said selective control unit, means actuated by energization of one of said first relays for connecting an incoming signalling channel to said lead, a plurality of second relays selectively actuated by the selective control unit in response to address signals preceding a message, said address signals being in the form of successive signal impulses received over said lead, and means operated by energization of one of said first and second relays for completing a direct signalling channel to an outlying receiving station.

10. In an automatic telegraph switching system, a plurality of outlying subscriber transmitting stations, a plurality of outlying subscriber receiving stations, a central switching office, a plurality of signalling channels interconnecting the outlying receiving and transmitting stations with the central office, said central switching office including a plurality of first relays, each of said relays being associated with one incoming signalling channel, means to energise a particular one of the first relays in accordance with the reception of a message for transmission in one of the outlying transmitting stations, means connecting together the first relays in a chain circuit wherein energization of one relay prevents the energization of any of the others, a selective control unit responsive to address signals, a plurality of horizontal selector magnets adapted to be individually energized by actuation of one of the first relays, means actuated by energization of one of the horizontal selector magnets for connecting the incoming signalling channel to the selective control unit, a crossbar switch associated with said horizontal selector magnets and adapted to have its horizontal connection completed by energization of one of the horizontal selector magnets, vertical relays adapted to be selectively actuated by energization of the selective control unit in accordance with an address signal preceding the message, said vertical relays upon energization acting to complete the transmission channel through the crossbar switch to the signalling channel of the selected outlying receiving station, and means actuated by energization of the vertical relays for de-energizing the first relays and horizontal selector magnets whereby the transmission channel is transferred from a path through the selective control unit to a path through the crossbar switch to the selected outlying receiving station.

11. In an automatic telegraph switching system, an outlying subscriber transmitting station, a plurality of outlying subscriber receiving stations, a central switching station, a plurality of signalling channels interconnecting the outlying stations with the central switching station, said central switching station including a first relay associated with the incoming signalling channel and adapted to be energized by reception of a message for transmission in the outlying subscriber transmitting station, a selective control unit responsive to address signals, a horizontal selector magnet adapted to be energized by actuation of the first relay, means operated by energization of the horizontal selector magnet for connecting the incoming signalling channel to the selective control unit, a crossbar switch associated with said horizontal selector magnet and adapted to have its horizontal connection completed by energization of the horizontal selector magnet, a plurality of vertical relays adapted to be selectively energized by the selective control unit in accordance with an address signal preceding the message, said vertical relays acting upon energization to complete the transmission channel through the crossbar switch to the signalling channel of the selected outlying receiving station, and means actuated by the energization of the vertical relays for de-energizing the first relay and horizontal selector magnet whereby the transmission channel is transferred from a path through the selective control unit to a path through the crossbar switch to the selected outgoing signalling channel.

12. In an automatic telegraph switching system, a plurality of outlying subscriber transmitting stations, an outlying subscriber receiving station, a central switching office, a plurality of signalling channels interconnecting the outlying subscriber stations with the central office, said central office including a plurality of first relays, each of which is associated with one of the incoming signalling channels, means to energize a particular one of the first relays upon reception of a message for transmission in one of the outlying subscriber transmitting stations, means interconnecting each of the first relays in a chain circuit whereby energization of one of the first relays prevents energization of any of the others, a selective control unit responsive to address signals, a plurality of horizontal selector magnets adapted to be individually energized by actuation of one of the first relays, means actuated by energization of one of the horizontal selector magnets for connecting the incoming signalling channel to the selective control unit, a crossbar switch associated with said horizontal selector magnets and adapted to have its horizontal connection completed upon energization of one of said horizontal selector magnets, a vertical relay means adapted to be energized by the actuation of the selective control unit in accordance with the address signal preceding the message, said vertical relay means upon energization acting to complete the transmission channel through the crossbar switch to the signalling channel of the outlying receiving station, means actuated by energization of the vertical relay means for deenergizing the first relay whereby the transmission channel is transferred from a path through the selective control unit to a path through the crossbar switch to the outgoing signalling channel, a plurality of overflow receivers, and means actuated by energization of the vertical relay means for directing subsequent messages from the other outlying subscriber transmitting stations to the overflow receivers during the transmission of a message from the first actuated outlying subscriber transmitting station.

13. In an automatic telegraph switching system, a plurality of outlying transmitting stations, a plurality of outlying receiving stations, a central switching office, a plurality of signalling channels interconnecting each of said outlying stations with the central switching office, indicators located at each outlying transmitter, said switching office including a plurality of first relay means individually actuated by one of said transmitters, a chain circuit interconnecting the relay means, means actuated by energization of any of the first relay means for breaking the chain circuit to prevent energization of any of the other relay means, means actuated by energization of the first relay means for intermittently operating the indicator at the transmitter waiting to transmit, a selective control unit, a plurality of horizontal selector magnets, means actuated by energization of one of the first relay means for energizing one of said horizontal selector magnets, means actuated by said horizontal selector magnets for connecting the signalling channel from the transmitter awaiting transmission to the selective control means, a crossbar switch adapted to have its horizontal connection completed upon energization of one of the horizontal selector magnets, a plurality of vertical relay means selectively energized by said selective control unit in accordance with address signals preceding a message, a plurality of second relay means associated individually with each transmitter, means controlled by the energization of one of the vertical relay means for energizing one of the second relay means, means actuated by the second relay means for de-energizing the first relay means to transfer the signalling channel to a path through the crossbar switch to an outgoing signalling channel, and means actuated by the energization of the second relay means for continually operating said indicator.

14. In an automatic telegraph transmission system, a plurality of outlying subscriber transmitting stations, a plurality of outlying subscriber receiving stations, a central switching office, a plurality of signalling channels interconnecting the outlying stations with the central office, a first indicator located at each outlying transmitting station for indicating the completion of an address channel, a second indicator located at each transmitter for indicating the completion of a signalling channel to a receiving station, said central office including a plurality of first relay means each individually associated with one of the said incoming signalling channels, a crossbar switch, a plurality of horizontal selector magnets adapted to close the horizontal connections of the crossbar switch, means actuated by energization of one of the first relays for actuating the first indicator and for energizing one of the horizontal selector magnets, a selective control unit adapted to be actuated in accordance with address signals preceding a message, means actuated by energization of one of the horizontal selector magnets to connect the signalling channel from the transmitter to the selective control unit, a plurality of vertical relay means selectively operated by said selective control means, said vertical relay means adapted upon actuation thereof to complete the vertical connection of the crossbar switch to connect the incoming signalling channel with the selected outgoing signalling channel, means actuated by energization of one of the vertical relay means for de-energizing the first relay means to disconnect the path of the incoming signalling channel from the selective control unit to permit the transmission of messages through the crossbar switch to the outgoing signalling channels, said de-energization of the first relay rendering the first indicator noneffective, and means controlled by the actuation of the vertical relay means for rendering effective the second indicator.

15. In an automatic telegraph message switching system, a plurality of outlying subscriber transmitters, a plurality of outlying subscriber receivers, a central switching office, a plurality of signal channels interconnecting the transmitters and receivers with the central office, said central office including a plurality of horizontal selector magnets individually associated with each transmitter, means for energizing one of the horizontal selector magnets upon initiation of transmission by its associated transmitter, a selective control unit, means operative upon energization of any of said horizontal selector magnets for connecting the signaling channel of the transmitter associated with the energized horizontal selector magnet to the selective control unit, a plurality of address relays associated with said selective control unit, said selective control unit including means for energizing a number of address relays in accordance with the reception of a number of address signals, a plurality of vertical relays individually associated with each address relay, means operated by the energized address relays for energizing the associated vertical relays, and means operated by the energization of one of said horizontal selector magnets and a number of said vertical relays for completing direct signaling channels from the energized transmitter to a number of receivers associated with the energized vertical relays, means within the selector control unit responsive to a special signal for de-energizing said address relays, and means operative by the energizing of the vertical relays and the de-energization of the address relays for de-energizing the energized horizontal selector magnets to break the signaling channel to the selective control unit.

RALPH H. HALVORSEN.

REFERENCES CITED

The following references are of record in the file of this patent:

UNITED STATES PATENTS

| Number | Name | Date |
|---|---|---|
| 2,382,128 | Bronson | Aug. 14, 1945 |
| 2,412,955 | Bacon et al. | Dec. 24, 1946 |
| 2,430,447 | Branson et al. | Nov. 11, 1947 |